Figure 1:
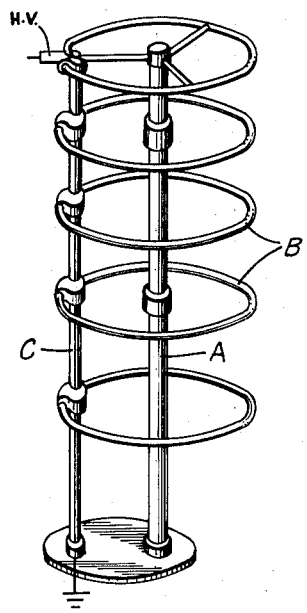

Jan. 7, 1964     H. STEPHANIDES     3,117,275
LOW CAPACITANCE VOLTAGE DIVIDER FOR ULTRA-HIGH VOLTAGES
Filed Sept. 28, 1959

INVENTOR.
Herbert Stephanides
BY
Pierce, Scheffler & Parker
Attorneys

3,117,275
LOW CAPACITANCE VOLTAGE DIVIDER FOR ULTRA-HIGH VOLTAGES
Herbert Stephanides, Zurich, Switzerland, assignor to Micafil A.-G., Zurich, Switzerland, a joint-stock company
Filed Sept. 28, 1959, Ser. No. 842,862
1 Claim. (Cl. 323—74)

The present invention relates to voltage dividers for use on high voltage systems and more particularly to an improved voltage divider having a low capacitance.

Each high-voltage divider must have a certain minimum length because of the necessary voltage intervals, and has therefore stray capacities distributed over the entire length, over which a part of the measuring current passes to the ground, which leads to falsifications of the measuring quantity. The harmful influence of these stray capacities can be eliminated in various ways. Known are arrangements where a control condenser surrounds the measuring impedance directly and enforces by its capacity a uniform voltage distribution along the measuring element. For better shielding of the measuring impedance, ring electrodes connected with the control condenser and closely surrounding the measuring impedance may be provided as disclosed in British Patent No. 220,785. Arrangements are also known where the high-voltage electrode is extended to a screen so that the potential in the vicinity of the measuring impedance is so controlled that each element of the measuring impedance can be arranged at a point whose electrostatic potential is equal to its potential. Maximum voltages, however, require extremely large screen diameters, which limits the usability for maximum voltages.

The solution of many measuring problems requires voltage dividers with a very low capacity for very high voltages. These dividers cannot be designed with a stray capacity surrounding the divider impedance directly, since a good control is only possible at relatively high capacities and interfering influences are transmitted, in the case of deviations from the linear voltage distribution along the control capacity over the relatively large coupling capacities to the measuring impedance, so that the measuring current is influenced in an undesired manner.

According to the present invention it is possible to produce a controlled voltage divider whose total earth capacity can be kept very low, and where the measuring impedance proper is nevertheless effectively screened against outer interfering influences and stray capacities.

The subject of the invention is a screened voltage divider, where the potential is controlled along the measuring impedance proper in a very coarse manner by a plurality of ring electrodes connected to separate voltage dividers, the diameter of these ring electrodes being at least a mulitple of the diameter of the measuring impedance. By this it is achieved that the coupling capacity between the control and measuring electrodes and hence the reactive effect of the control voltage on the divider current remain very small.

FIG. 1 of the drawings illustrates an embodiment of the improved voltage divider, the divider being shown in perspective.

Figure 2:
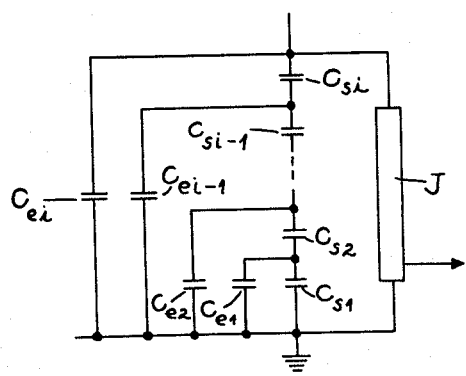

FIG. 2 is the equivalent electrical circuit diagram for the structure shown in FIG. 1.

With reference now to FIGS. 1 and 2, the potential is controlled by metallic rings B arranged concentrically about the measuring impedance A. These rings which function as control electrodes are poled with a separate control condenser C, the partial capacities thereof being so graded that through the combination of the control capacities $C_{s1} \ldots C_{sl}$ and the stray capacities to earth $C_{e1} \ldots C_{el}$ according to the equivalent-circuit diagram in FIG. 2, an approximately linear voltage distribution over the control capacities $Cs$ and thus also along the divider impedance J surrounded by it is obtained.

If the diameter of the electrode rings B is selected sufficiently large, the capacities remain so low between them and the measuring impedance that the interference voltage transmitted from the control rings to the measuring impedance remains low, even with certain deviations from the uniform potential control.

Thus it is possible to select the control capacity very low, since deviations from the linear voltage distribution along the control condenser, caused by glow discharge phenomena, the influence of varying stray capacities, deviations in the arrangement of control and measuring elements and other effects, only lead to relatively minor influences on the divider current. In the extreme case it is even possible to make the partial capacity $C_{s1}$ of the control condenser C on the earth side disappear, and to put in the equivalent circuit diagram in FIG. 2 $C_{s1}$ equals 0. The stray capacity $C_{e1}$ of the bottom potential control ring B forms then alone the bottom capacity of the potential control.

Since the individual potential control rings B screen each other toward the outside in the manner of bundled conductors, it is also possible to dimension the rings so that no glow discharge phenomena can appear on the outside of the rings, even with very high voltages, so that the control is maintained without falsification, even at high voltages.

Preferably, as shown in FIG. 1, the potential control rings B are arranged in increasingly shorter intervals with increasing high voltage potential, so that an improved screening according to the principle of the bundled conductors is achieved, with identical design of the rings. This way it is possible to coordinate the surface field strengths at the control electrodes and the safety against the appearance of glow discharge phenomena in a very simple manner.

The voltage control according to the invention is suitable both for alternating voltages and for impulse voltages, with resistances or condensers being used at will as a measuring impedance.

I claim:

A low capacity voltage divider for high voltage comprising an elongated cylinder like measuring impedance connected at one end to said high voltage and at the other end to ground, a plurality of ring electrodes arranged in spaced relation along the axis of said measuring impedance, said ring electrodes being concentric with said measuring impedance and having a diameter which is at least a multiple of the diameter of said measuring impedance and being arranged at progressively decreasing distances apart as measured from ground toward said high voltage, and control condensers connected between said ring electrodes, the respective capacitances of said control condensers being so graded that by the combination of the control capacitances and the stray capacitances to ground there results approximately a linear voltage distribution over the control capacitances and hence also along the measuring impedance surrounded by them.

References Cited in the file of this patent
FOREIGN PATENTS
220,785    Great Britain _____ Aug. 28, 1924